Figure 1:
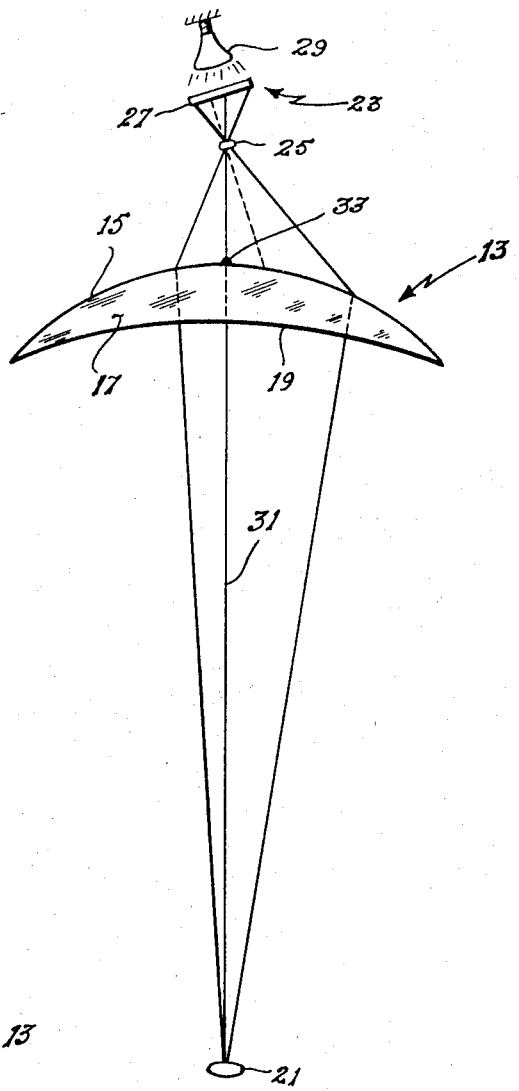

Sept. 17, 1968   F. DINHOBEL ET AL   3,401,595
SCALE FACTOR CORRECTION DEVICE
Filed March 23, 1966

INVENTORS.
FRIEDRICH DINHOBEL and
JAMES H. MILLER
BY Harry A. Herbert Jr.
Arsen Tashjian
ATTORNEYS Patented Sept. 17, 1968

3,401,595
SCALE FACTOR CORRECTION DEVICE
Friedrich Dinhobel, University City, Mo., and James H. Miller, Thousand Oaks, Calif., assignors, by mesne assignments, to the United States of America as represented by the Secretary of the Air Force
Filed Mar. 23, 1966, Ser. No. 538,178
6 Claims. (Cl. 88—24)

This invention relates to a method and apparatus for correcting the distortion in aerial photographs caused by the angular position of the aerial camera with respect to the field of view covered. More particularly, the invention is concerned with providing means for reducing the gradient in radial scale factor of aerial photographs by projecting an image of the aerial photograph on a spherical screen and photographing the projected image from a position selected to minimize radial position distortion.

There are many presently known methods for rectifying aerial photographs to correct for the tilt angle of the camera which made the original photograph. These methods generally include means for projecting a diapositive made from an aerial photograph at an angle substantially the same as that from which the original photograph was taken. The projection is made onto a plane surface. An alternative method of correcting the photograph for angular deviations would be to tilt the plane surface on which the image is projected with relation to the optical axis of the projector. Various optical systems have been employed in projecting the image including pinhole apertures and point source of illumination. However, in all cases, the projection is made onto a plat or screen which is a plane surface.

The above described methods may be considered sufficient for rectifying distortion caused by the angular tilt of the aerial camera when the photograph is made from an aircraft which is flying in the atmosphere. In these situations the earth's surface may be considered, for all practical purposes, as a flat plane. However, when photographing the earth from an orbiting satellite many miles above the earth, wide areas are covered and the curvature of the earth's surface is a significant parameter to be considered when analyzing the aerial photograph thus made. The earth's curvature is even more significant when the angle of the camera is tilted from true vertical and a distorted photograph results. Previously known methods cannot be effectively utilized to correct this type of distortion.

Accordingly, it is an object of the present invention to provide a method and apparatus for rectifying distortion errors in aerial photographs caused by tilt angle of camera from vertical and curvature of the earth's surface.

Another object of the invention is to provide a method and means for accurately determining the position of objects on the earth's surface and their relative size and spatial relationship.

A further object of the invention is to provide apparatus which can be used to rectify aerial photographs taken from great heights and at oblique angles to the earth's surface. The apparatus includes a camera which photographs an image projected on a curved surface corresponding to the curvature of the earth.

Still another object of the invention is to provide aerial photograph rectifying apparatus which corrects the distortion inherent in photographs taken from orbiting satellites by compensating for curvature of the earth and tilt of the aerial camera from vertical. A curved screen receives an image projected at an angle equal to the tilt of the aerial camera and the projected image is then rephotographed by a camera located at a selected point behind the curved screen.

A still further object of the invention is to provide a method for rectifying aerial photographs by projecting the distorted photographic image onto the convex side of a translucent spherical screen which simulates a portion of the earth's surface. The projected image is then photographed from a preselected position on the concave side of the screen thereby correcting for distortion caused by radial position errors in the original photograph.

These and other objects, features, and advantages will become more apparent after considering the following detailed description taken in conjunction with the annexed drawings and appended claims.

Figure 2:
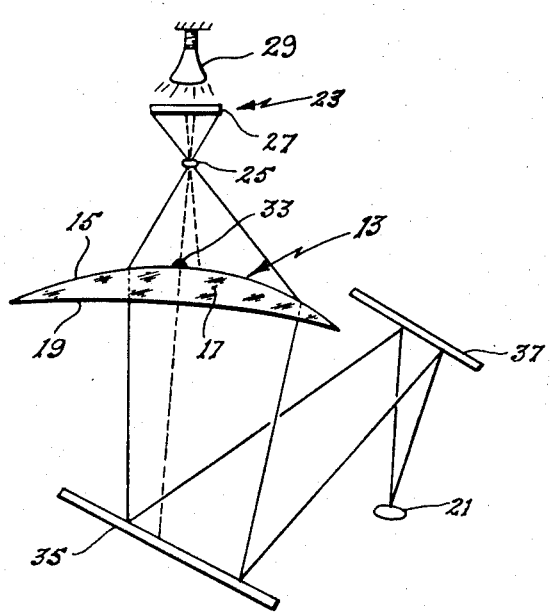

In the drawings, wherein like reference characters refer to like parts in the views:

FIG. 1 is a view in schematic of one embodiment of invention showing the relative position of the various elements; and FIG. 2 is a view in schematic of another embodiment of the invention utilizing the folded optics principle to produce a more compact apparatus.

Referring now to the figures wherein like reference characters are used to refer to like elements of the apparatus, the invention includes a translucent spherical screen generally designated by the character 13 and having a surface curvature which corresponds to the earth's surface. The screen 13 may be made by grinding the convex spherical surface 15 on a block of glass 17 and frosting the ground surface to make it translucent. The inner surface 19 is ground so that the rays from the translucent surface 15 pass through it perpendicularly. A camera 21 is positioned to photograph the scene which is projected on the surface 15 of the screen 13 by the projector 23. The projector lens 25 focuses the image of the diapositive 27 carried by the light rays from the light source 29 onto the frosted surface 15 of the screen 13.

The orientation of the optical axis of the projector 23 and the position of the second nodal point of the projector lens 25 are adjusted relative to the spherical screen 13 so as to correspond to those of the camera at the time the original photograph was taken. Thus, the scene in the aerial photograph which is projected by the projector 23 appears on the spherical screen 13 as it did originally on the surface of the earth. The first nodal point of the lens of the camera 21 is placed at a selected point on the concave side of the translucent spherical screen 13. This point would be on a line through the nadir point 33 and the center of curvature, at a distance of three spherical radii from the nadir point. The camera optical axis 31 is aligned with the line through the nadir point 33 and the center of curvature of the spherical screen 13.

In the practice of the invention an aerial photograph in the form of a diapositive 27 is inserted in a projector 23 having a projector lens 25. The optical axis of the projector 23 is oriented to correspond to the angle of the aerial camera at the time that the original aerial photograph was made. The projected image impinges on the upper surface 15 of the spherical screen 13, which is shaped to simulate a portion of the earth's surface. The upper surface 15 of the spherical screen 13 is frosted to make it translucent.

A copy camera 21 is positioned at a selected point spaced from the concave side of the spherical screen 13. The lower surface 19 of the spherical screen is ground so that the rays from the translucent surface 15 pass through it perpendicularly. The optical axis 31 of the camera 21 is aligned so that the photographic record shows the rectified image on the translucent surface 15. This is accomplished by situating the camera such that the optical axis 31 passes through the center of curvature of the spherical screen 13 and the nadir point 33.

In the embodiment of the invention shown schematically in FIG. 2, the device is illustrated in shortened form. By using plane reflecting surfaces 35 and 37 the length of the device is shortened and a more compact system results. An alternate implementation of the light source may include an ultra-violet light in conjunction with a thin phosphor deposited on the spherical surface 15. This last arrangement would make frosting of the spherical surface 15 unnecessary.

Although the invention has been illustrated and described in terms of preferred embodiments thereof, it will be apparent to one skilled in the art that certain changes, alterations, modifications and substitutions can be made in the arrangement and location of the various elements without departing from the spirit and scope of the appended claims.

Having thus set forth and described the nature of our invention, what we claim is:

1. Apparatus for the rectification of aerial photographs taken from extreme heights above the earth and at oblique angles to the vertical comprising a screen having one surface spherically ground, said spherically ground surface being translucent, the other surface of said screen being concave and shaped to allow rays from said translucent surface to pass perpendicularly therethrough, means for projecting an image of the aerial photograph onto said translucent surface, said projecting means being positioned relative to said screen to correspond to the angle of the camera which made the original aerial photograph, camera means spaced from the concave surface of said spherical screen, the optical axis of said camera means being in alignment with a line through the center of curvature of said spherical screen for photographing the image projected on the translucent surface of said spherical screen.

2. The apparatus for the rectification of aerial photographs defined in claim 1 wherein a plurality of reflecting surfaces are interposed between the spherical screen and the camera means, said reflecting surfaces diverting the image carrying rays to allow the camera means to be positioned in closer physical proximity to said spherical screen to provide a more compact apparatus.

3. An image projection system for rectifying distortion errors in aerial photographs taken from extreme heights above the earth and at oblique angles to the vertical comprising, in combination, a spherical screen having one surface coated with a thin transparent film of phosphor, the other surface of said screen being concave and shaped to allow rays from said phosphor coated surface to pass perpendicularly therethrough, means for projecting an image of the aerial photograph onto said phosphor coated surface, said projecting means being positioned relative to said screen to correspond to the angle of the camera which made the original aerial photograph, camera means spaced from the concave surface of said spherical screen, the optical axis of said camera means being in alignment with a line through the center of curvature of said spherical screen for photographing the image projected on the phosphor coated surface of said spherical screen.

4. The image projection system defined in claim 3 wherein said projecting means includes an illumination source of ultra-violet light, said illumination source reacting with the phosphor coating on said spherical screen to produce an image which is photographable by said camera means.

5. The method of rectifying radial position errors in aerial photographs taken from extreme heights above the earth and at oblique angles to the vertical comprising the steps of projecting an image of the aerial photograph at an angle corresponding to the deviation angle of the camera with relation to the earth when the original photograph was made, receiving the projected image on one surface of a spherical screen having a radius of curvature to simulate the earth's surface, and photographing the projected image from a preselected position spaced from the other surface of the spherical screen along a line which passes through the center of curvature of said spherical screen thereby minimizing the radial position error which was caused by the oblique angle of the camera to the earth when the original photograph was made.

6. The method of rectifying medial position errors defined in claim 5 wherein the preselected position from which the projected image is photographed is equal to a distance of three spherical radii from a nadir point on the spherical screen.

References Cited
UNITED STATES PATENTS

| | | | |
|---|---|---|---|
| 2,299,682 | 10/1942 | Conant | 88—24 |
| 2,448,568 | 9/1948 | Zwillinger et al. | 88—24 |
| 3,026,765 | 3/1962 | Guarricini et al. | 88—24 |

NORTON ANSHER, *Primary Examiner.*

RICHARD A. WINTERCORN, *Assistant Examiner.*